United States Patent [19]

Logan et al.

[11] Patent Number: 4,491,352

[45] Date of Patent: Jan. 1, 1985

[54] PIPE JOINT

[75] Inventors: Frank G. Logan, Framingham; Wilfred V. Johnson, Oxford, both of Mass.

[73] Assignee: U.S. Fire Control Corporation, Rochdale, Mass.

[21] Appl. No.: 429,218

[22] Filed: Sep. 30, 1982

[51] Int. Cl.³ .............................................. F16L 17/04
[52] U.S. Cl. .................................... 285/373; 285/420; 285/383
[58] Field of Search ................ 285/373, 419, 383, 420

[56] References Cited

U.S. PATENT DOCUMENTS

| 1,255,417 | 2/1918 | Hedges | 285/419 |
| 1,566,953 | 12/1925 | Becker | 285/373 X |
| 2,903,279 | 9/1959 | Bergstedt et al. | 285/373 |
| 4,310,183 | 1/1982 | Szalvay | 285/373 X |
| 4,310,184 | 1/1982 | Campbell | 285/423 X |

FOREIGN PATENT DOCUMENTS

| 444596 | 2/1968 | Switzerland | 285/373 |
| 617617 | 7/1978 | U.S.S.R. | 285/419 |

Primary Examiner—Dave W. Arola
Attorney, Agent, or Firm—John E. Toupal; Harold G. Jarcho

[57] ABSTRACT

A pipe joint consisting of first and second pipes having ends juxtaposed to provide a fluid tight interconnection therebetween. An outer surface of the first pipe defines a first circumferential coupling groove and a first circumferential seal groove disposed between the first coupling groove and the connected end of the first pipe. An outer surface of the second pipe defines a second circumferential coupling groove and a second circumferential seal groove disposed between the second coupling groove and the joined end of the second pipe. Fitted over the outer surfaces of the first and second pipes is a resilient sleeve covering the first and second seal grooves. A clamp assembly with inward projections overlays the sleeve and is radially collapsible to forcibly engage the resilient sleeve. Engaging the clamp assembly is a latch mechanism that exerts thereon inwardly directed forces that retain the inward projections within the first and second coupling grooves and o-ring portions of the resilient sleeve within the first and second seal grooves.

14 Claims, 9 Drawing Figures

PIPE JOINT

BACKGROUND OF THE INVENTION

The present invention relates to mechanical pipe couplings and, more particularly, to pipe couplings for providing fluid-tight joints between two abutting pipe ends in a pressure system.

Pipe systems are used in a wide variety of installations, such as in the mining and petroleum industry, in industrial, commercial, and residential buildings, and the like. Such pipe systems can be generally classified into two categories, namely nonpressure systems and pressure systems. While the type of pipe used in these two systems may not change significantly, if at all, the methods of joining sections of pipe do vary significantly.

For example, in the case of nonpressure systems, simple pipe couplings have been developed including a resilient annular gasket being positionable around the abutting pipe ends, an elongate, planar, flexible, connecting shield being positionable around the sealing gasket, and a pair of hose clamps being positionable around the sides of the connecting shield, the clamps being tightenable to secure the sides of the connecting shield to the pipe ends, with the sealing gasket therebetween. Such a coupling is widely used and is highly satisfactory in a nonpressure system. However, since there is no mechanical connection between the connecting shield and the pipe ends, such a coupling would not hold the pipe ends together in a pressure system.

The need for pipe joints which hold in a pressure system has given rise to threading, welding, and flanging as methods of joining pipe. All three methods are reasonably efficient but have certain disadvantages associated therewith. These problems are largely solved by available mechanical coupling methods of joining pipe in pressure systems. The known mechanical pipe couplings incorporate most of the desirable features of other coupling methods but, in addition, are comparably smaller, lighter, and can be installed in less time. Mechanical couplings eliminate the need for flanges or unions and allow easy disassembly for cleanout and replacement.

While such mechanical pipe couplings represent a significant advance in the state of the art over threading, welding, and flanging as methods of joining pipe, certain problems still exist. Examples of such problems include requirements for expensive materials, inherent bulkiness, excessive weight, high manufacturing costs, cumbersome assembly procedures, etc.

The object of this invention, therefore, is to provide an improved mechanical coupling for creating fluid-tight pipe joints.

SUMMARY OF THE INVENTION

The invention is a pipe joint consisting of first and second pipes having ends juxtaposed to provide a fluid tight interconnection therebetween. An outer surface of the first pipe defines a first circumferential coupling groove and a first circumferential seal groove disposed between the first coupling groove and the connected end of the first pipe. An outer surface of the second pipe defines a second circumferential coupling groove and a second circumferential seal groove disposed between the second coupling groove and the joined end of the second pipe. Fitted over the outer surfaces of the first and second pipes is a resilient sleeve covering the first and second seal grooves. A clamp assembly with inward projections overlays the sleeve and is radially collapsible to forcibly engage the resilient sleeve. Engaging the clamp assembly is a latch mechanism that exerts thereon inwardly directed forces than retain the inward projections within the first and second coupling grooves and o-ring portions of the resilient sleeve within the first and second seal grooves. Retention of the inward clamp projections within the first and second coupling grooves establishes rigid pipe joint by preventing separation of the first and second pipes while the retained o-ring portions of the sleeve provide circumferential fluid seals that prevent fluid leakage from the pipe joint.

According to one feature of the invention, the resilient sleeve is a unitary number that extends over and between the first and second seal grooves. The unitary sleeve simplifies assembly of the joint and establishes with the outer surfaces of the first and second pipes surface seals that enhance the fluid seals provided by the retained o-ring portions.

According to another feature of the invention, the clamp assembly includes a plurality of longitudinally separated, radially collapsible arcuate sections each terminating longitudinally with inwardly directed skirts that are retained within the first and second coupling grooves of the joined pipes. The longitudinally separated arcuate sections are substantially coextensive with and radially collapsible into compressive engagement with the resilient sleeve so as to establish the fluid tight seals and the retained arcuate skirts provide a structurally stable joint between the pipes.

According to yet another feature of the invention, the latch mechanism comprises an annular member with inner dimensions smaller than the outer dimensions of the clamp assembly prior to being radially collapsed into compressive engagement with the resilient sleeve. According to this arrangement, the clamp assembly can receive the annular latch only after being radially collapsed and thereafter provides the inwardly directed force that retains the inward clamp protections within the coupling grooves and compresses the o-ring sleeve portions within the seal grooves.

According to still another feature of the invention, the clamp assembly possesses an outwardly directed stem that is received by an opening in the annular latch mechanism after compression of the resilient sleeve. The engaged stem and receiving opening lock the completed pipe joint in place.

According to another feature of the invention, the coupling and seal grooves are rolled into the outer surfaces of the pipes creating internal ridges thereon. The use of relatively thin walled pipes and a rolling process to create the grooves reduces the overall cost of the completed pipe joint.

According to one embodiment of the invention, the sleeve member extends between the first and second coupling grooves so as to prevent direct contact between the inward clamp projections and the outer pipe surfaces. This arrangement prevents metal to metal contact and high line contact loading of sharp metal edges that could cause cutting and joint failure under certain conditions of vibration.

According to another embodiment of the invention, the resilient sleeve comprises first and second annular sealing ridges longitudinally aligned, respectively, with the first and second seal grooves and an inwardly directed annular rib disposed between the juxtaposed ends of the first and second pipes. The sealing ridges enhance the o-ring seals created in the seal grooves and the annular rib provides thermal and mechanical isolation between the joined pipes.

According to another embodiment of the invention, the clamp assembly comprises a plurality of arcuate sections joined by reduced bridge portions bent to form with the arcuate sections a longitudinally split cylinder radially collapsed into engagement with the resilient sleeve. This arrangement facilitates assembly of the pipe joint with a single clamp member that can be produced by an inexpensive stamping operation.

According to still another embodiment of the invention, the clamp assembly defines first and second inwardly directed clamping ridges that are longitudinally aligned, respectively, with the first and second seal grooves. The clamping ridges increase the radial pressure on the resilient sleeve within the seal grooves thereby enhancing the integrity of the fluid seals.

DESCRIPTION OF THE DRAWINGS

These and other features and objects of the invention will become more apparent upon a perusal of the following specification taken in conjunction with the accompanying drawings wherein.

DESCRIPTION OF THE PREFERRED EMBODIMENT

Figure 1:
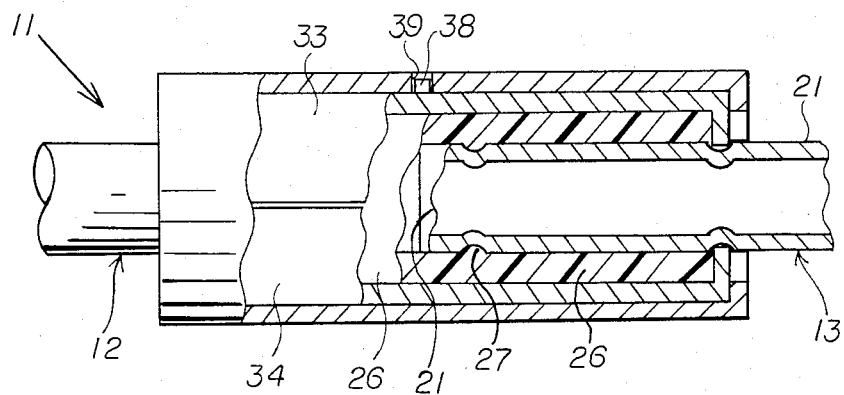
FIG. 1 is a partially cut away view of a pipe joint according to the invention.
Figure 2:
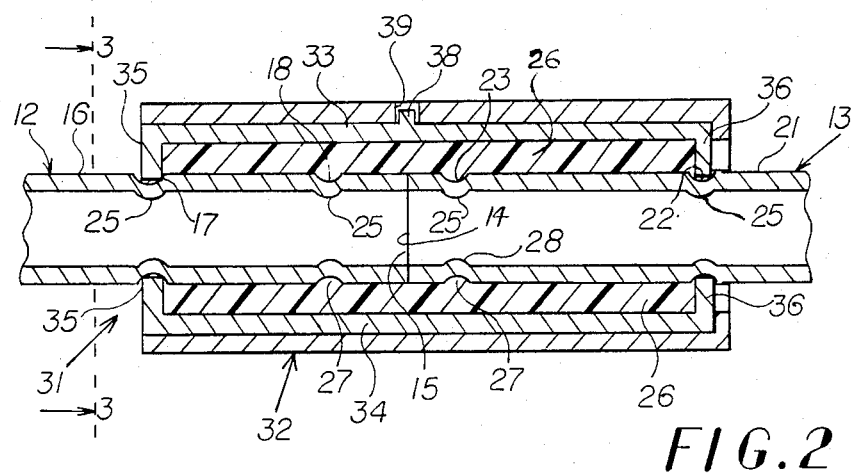
FIG. 2 is a schematic cross-sectional view of the pipe joint shown in FIG. 1.
Figure 3:
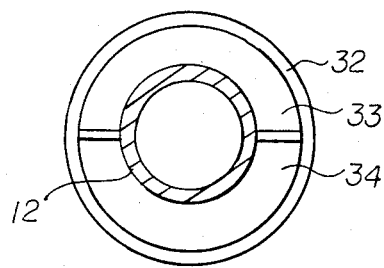
FIG. 3 is a cross-sectional view taken along lines 3—3 of FIG. 2.

Referring now to FIGS. 1–3 there is shown a pipe joint 11 according to the invention. The pipe joint 11 includes first and second pipes 12, 13 having, respectively, juxtaposed ends 14, 15 concentrically joined to create a fluid-tight connection. Formed in an outer surface 16 of the first pipe 12 are a first circumferential coupling groove 17 and a first circumferential seal groove 18 disposed between the coupling groove 17 and the pipe end 14. Identically formed in an outer surface 21 of the second pipe 13 is a second coupling groove 22 and a second seal groove 23 disposed between the coupling groove 22 and the pipe end 15. Preferably, the first and second pipes 12 and 13 are thin walled tubes and the coupling and seal grooves 17, 22 and 13, 23, respectively, are formed by a rolling process resulting in the formation of internal annular ridges 25.

A resilient sealing sleeve 26 engages the outer surfaces 16 and 21 and covers the first and second seal grooves 18, 23. Forced into the first and second seal grooves 18, 23, respectively, are first and second o-ring portions 27, 28 of the resilient sleeve 26. The o-ring seals 27, 28 establish fluid-tight seals that prevent the leakage from the pipe joint 11 of fluid being transmitted by the pipes 12 and 13. The fluid-tight seal is enhanced by the relatively large surface contact provided between the engaging cylindrical surfaces of the pipes 12, 13 and the resilient sleeve 26.

A clamp assembly 31 encircles the resilient sleeve 26 and exerts radially, inward compressive force thereon. Maintaining that compressive force is a cylindrical latch member 32 that surrounds the clamp assembly 31. As shown, the clamp assembly 31 consists of a pair of longitudinally aligned, semi-cylinders 33, 34 with inner surfaces that engage the resilient sleeve 26 and outer surfaces that are engaged by the inner surface of the latch cylinder 32. Formed at opposite longitudinal ends of the semi-cylinders 33, 34, respectively, are inwardly directed first skirt projections 35 and second skirt projections 36. The coupling grooves 17 and 22 respectively, receive outer peripheries of the skirts 35 and 36, thereby coupling together and preventing longitudinal separation of the pipes 12 and 13. Terminal portions 40 of the resilient sleeve isolate the skirts 35, 36 from the surfaces of the coupling grooves 17, 22 so as to prevent direct metal-to-metal contact therebetween. Extending outwardly from the semi-cylinder 33 is a centrally located boss 38 that is received by an opening 39 in the latching cylinder 32.

ASSEMBLY OF THE INVENTION

During assembly of the pipe joint 11, both the resilient sleeve 26 and the latching cylinder 32 are passed over the exposed end of either of the pipes 12, 13. The other pipe is then brought into abutment therewith and the flexible sleeve 26 is moved into a position covering outer surface portions of both pipes and the seal grooves 18 and 23 as shown in FIG. 2. Next, the semi-cylindrical clamp numbers 33 and 34 are positioned in diametrically opposed positions over the flexible sleeve 26. Application of radially inwardly pressure on the clamps 33, 34 compresses the o-ring portions 27, 28 of the resilient sleeve 26 into the seal grooves 18, 23 and forces and moves the arcuate skirts 35, 36 into the coupling grooves 17, 22, respectively, as also shown in FIG. 2. Prior to the compression of the sleeve 26 the outer diameter of the assembled clamp members 33 and 34 is greater than the inner diameter of the latching cylinder 32. However, with compressive pressure maintained on the clamp members 33, 34 to reduce the outer diameter thereof, the latch cylinder 32 is passed over the members 33, 34 producing alignment between the boss 38 and the opening 39. The outward pressure produced by the compressed resilient sleeve 26 forces the boss 38 into the opening 39 to establish a mechanical coupling between the latch cylinder 32 and the clamp members 33, 34. The dimensions of the components are such as to maintain in that condition, however, a compressive force on the resilient sleeve that retains the o-ring portions 27, 28 within the seal grooves 18, 23 and establishes a fluid-tight seal between the joined pipe ends 14 and 15. The fluid seal is further enhanced by the extensive region of contact between the inner surface of the resilient sleeve 26 and the outer surfaces 16, 21 of the pipes 12 and 13. In addition, the latch cylinder 32 retains the arcuate skirts 35 and 36 within the coupling grooves 17, 22 so as to prevent separation of the pipes 12, 13 and thereby maintain a rigid mechanical coupling between.

OTHER EMBODIMENTS

Figure 4:
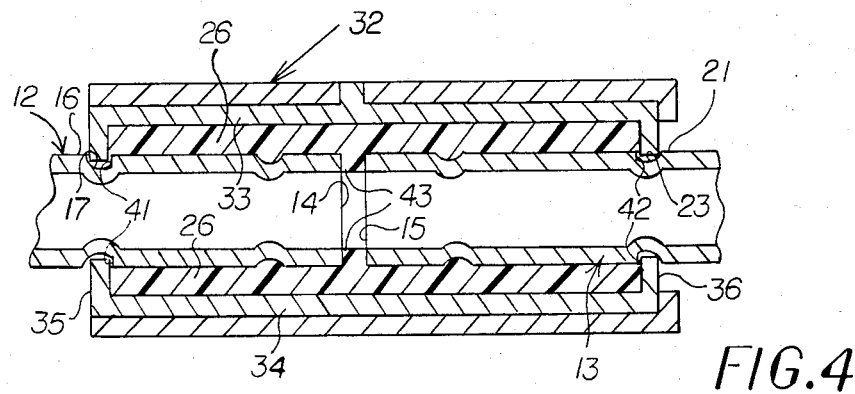
FIG. 4 is a schematic cross-sectional view of another embodiment of the invention.

FIG. 4 illustrates another embodiment in which components similar to those shown in FIGS. 1-3 have been given identical reference numerals. In this embodiment the clamp member coupling grooves 17 and 23, respectively, include surfaces 41 and 42 oriented orthogonally to the outer surfaces 16 and 21. The orthogonal surfaces 41 and 42 directly engage the skirts 35 and 36 and provide an increased resistance to separation of the joined pipes 12 and 13. Another feature of the embodiment shown in FIG. 4 is an inwardly directed annular rib 43 formed on the resilient sleeve 26. The rib 43 is disposed between the juxtaposed ends 14 and 15 of the pipes 12 and 13 and prevents shock transmission from one pipe to another. This feature provides mechanical, thermal and even electro-chemical isolation between two pieces of tubing. It could be used, for example, for joining two different metal-alloy tubes or metal and non-metal tubes (such as metal to plastic, metal to glass).

In the case of the two different metals being joined, the isolating rib 43 would avoid any electro-chemical corrosion which might otherwise occur. In the case of metal to non-metal, isolation from shock, differential coefficient of expansion and thermal transmission can all be achieved with this approach.

Figure 5:
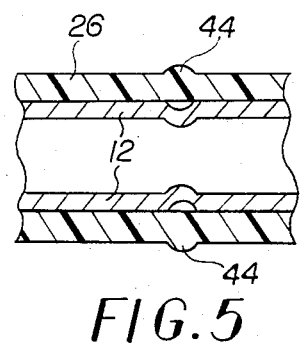
FIG. 5 is a schematic cross-sectional view of another embodiment of the invention.

FIG. 5 illustrates another embodiment in which the resilient sleeve 26 possesses annular sealing ridges 44 (one of which is shown) that are longitudinally aligned, respectively, with the seal grooves 18 and 23. The ridges 44 are more forcefully compressed into the seal grooves 18 and 23, thereby providing increased sealing and isolation capability. Location of the annular ridges 44 on the outer surface to the resilient sleeve 26 simplifies molding requirements.

Figure 6:
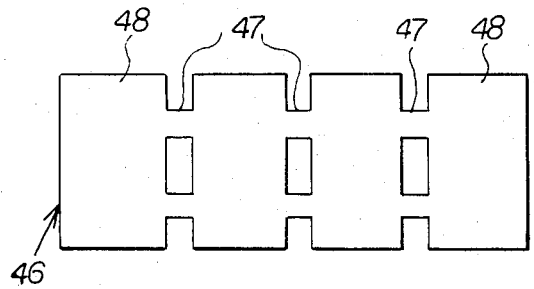
FIG. 6 is a plan view of a modified clamp assembly for use with the pipe joint shown in FIG. 1.
Figure 7:
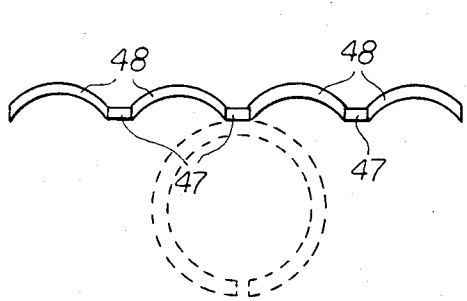
FIG. 7 is an end view of the clamp assembly shown in FIG. 6.

FIGS. 6 and 7 illustrate another clamp embodiment in which the clamp members 33 and 34 are replaced by a single element 46 having narrow, crimped bridge bands 47 which hold arcuate sections 48 together and which readily permit bending thereof (as shown by dashed lines) so that clamp sections will fit around the resilient sleeve 26. There can be two or more such inter-connected clamp elements depending upon size of the pipes 12 and 13.

Figure 8:
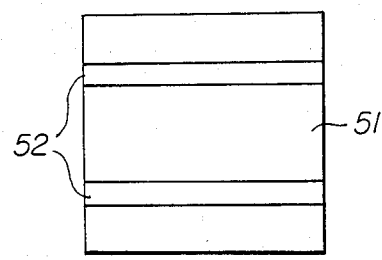
FIG. 8 is a plan view of another modified clamp assembly for use with the pipe joint shown in FIG. 1.
Figure 9:
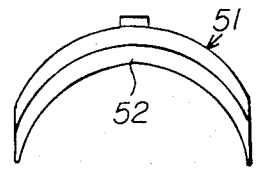
FIG. 9 is an end view of the clamp assembly shown in FIG. 8.

FIGS. 8 and 9 illustrate yet another clamp embodiment in which semi-cylindrical clamp members 51 are formed with inwardly directed clamping ridges 52 that are disposed for longitudinal alignment with the seal grooves 18 and 23 shown in FIG. 2. After assembly of a joint, the ridges 52 increase the inward pressure on the sleeve 26 adjacent to the seal grooves 18 and 23 thereby providing higher sealing pressures.

What is claimed is:

1. A pipe joint comprising:
   a first pipe with an outer surface defining a first circumferential coupling groove and a first circumferential seal groove disposed between said first coupling groove and one end of said first pipe;
   a second pipe with an outer surface defining a second circumferential coupling groove and a second circumferential seal groove disposed between said second coupling groove and an end of said second pipe juxtaposed to said one end of said first pipe;
   resilient sleeve means fitted over said outer surfaces of said first and second pipes and covering said first and second seal grooves, said sleeve means comprising a first circumferential o-ring portion longitudinally aligned with said first seal groove and a second circumferential o-ring portion longitudinally aligned with said second seal groove;
   a clamp means overlaying said sleeve means and being radially collapsible to forcibly engage said resilient sleeve means; said clamp means comprising inwardly directed projections longitudinally aligned with said first and second coupling grooves; and
   latch means engaging said clamp means and exerting thereon an inwardly directed force that retains said projections within said first and second coupling grooves and forces said first and second o-ring portions, respectively, into said first and second seal grooves.

2. A pipe joint according to claim 1 wherein said projections comprise first and second inwardly directed skirt means longitudinally spaced apart on said clamp means, said first skirt means retained within and substantially coextensive with said first coupling groove and said second skirt means retained within and substantially coextensive with said second coupling groove.

3. A pipe joint according to claim 2 wherein said clamp means comprises a plurality of longitudinally separated, radially collapsible, arcuate sections retained in compressive engagement with said sleeve means by said latch means.

4. A pipe joint according to claim 3 wherein said latch means comprises an annular member encircling said clamp means.

5. A pipe joint according to claim 4 wherein said annular member comprises inner dimensions that are smaller than outer dimensions of said clamp means prior to radial collapse thereof into compressive engagement with said sleeve means.

6. A pipe joint according to claim 1 wherein said sleeve means is a single sleeve extending over and between said first and second seal grooves.

7. A pipe joint according to claim 1 wherein said first and second coupling grooves comprise engaging surfaces substantially orthogonal to said outer surfaces and engaging said projections.

8. A pipe joint according to claim 1 wherein said sleeve means extend between said first and second coupling grooves so as to prevent direct contact between said projections and said outer surfaces.

9. A pipe joint according to claim 1 wherein said sleeve means comprises an inwardly directed annular rib portion disposed between the said juxtaposed ends of said pipes, so as to prevent direct contact therebetween.

10. A pipe joint according to claim 1 wherein said first and second o-ring portions comprise, respectively, first and second outwardly directed annular sealing ridges, said first sealing ridge being longitudinally aligned with said first seal groove and said second sealing ridge being longitudinally aligned with said second seal groove.

11. A pipe joint according to claim 1 wherein said clamp means comprises a plurality of arcuate sections joined by bridge portions bent to form with said arcuate sections a longitudinally split cylinder radially collapsed into engagement with said sleeve means.

12. A pipe joint according to claim 1 wherein said clamp means defines first and second inwardly directed clamping ridges longitudinally aligned respectively with said first and second seal grooves.

13. A pipe joint according to claim 1 wherein said seal and coupling grooves are rolled into said outer surfaces forming annular ridges on the inner surfaces of said first and second pipes.

14. A pipe joint according to claim 1 wherein said clamp means comprises an outwardly directed stem portion, and said latch means comprises an opening that retains said stem.

* * * * *